(12) United States Patent
Larson et al.

(10) Patent No.: US 8,851,765 B2
(45) Date of Patent: Oct. 7, 2014

(54) COLLAR BODY FOR FIELD TERMINABLE OPTICAL CONNECTOR

(75) Inventors: Donald K. Larson, Cedar Park, TX (US); Wesley A. Raider, Hudson, WI (US); Joseph C. Sawicki, Austin, TX (US); Daniel J. Treadwell, Austin, TX (US)

(73) Assignee: 3M Innovative Properties Company, St. Paul, MN (US)

(*) Notice: Subject to any disclaimer, the term of this patent is extended or adjusted under 35 U.S.C. 154(b) by 441 days.

(21) Appl. No.: 13/260,861

(22) PCT Filed: Apr. 1, 2010

(86) PCT No.: PCT/US2010/029600
§ 371 (c)(1),
(2), (4) Date: Sep. 28, 2011

(87) PCT Pub. No.: WO2010/123670
PCT Pub. Date: Oct. 28, 2010

(65) Prior Publication Data
US 2012/0027360 A1    Feb. 2, 2012

Related U.S. Application Data

(60) Provisional application No. 61/171,908, filed on Apr. 23, 2009.

(51) Int. Cl.
*G02B 6/36* (2006.01)
*G02B 6/38* (2006.01)

(52) U.S. Cl.
CPC ............ *G02B 6/3818* (2013.01); *G02B 6/3871* (2013.01); *G02B 6/3846* (2013.01); *G02B 6/3822* (2013.01); *G02B 6/3847* (2013.01); *G02B 6/3806* (2013.01); *G02B 6/3869* (2013.01)

USPC ................. 385/78; 385/53; 385/88; 385/90; 385/92; 385/139; 385/55; 385/72

(58) Field of Classification Search
None
See application file for complete search history.

(56) References Cited

U.S. PATENT DOCUMENTS 4,354,731 A * 10/1982 Mouissie ................. 385/72
4,746,188 A    5/1988 Loeffler
(Continued)

FOREIGN PATENT DOCUMENTS

EP    0 443 454 A2    8/1991
JP    2008-268280 A    11/2008
(Continued)

OTHER PUBLICATIONS

China Search Report, mailed on Jun. 24, 2013, 1 p.
(Continued)

*Primary Examiner* — Uyen Chau N Le
*Assistant Examiner* — Chad Smith
(74) *Attorney, Agent, or Firm* — Kristofor L. Storvick

(57) ABSTRACT

An optical fiber connector for terminating an optical fiber is provided. The optical fiber connector includes a housing configured to mate with a receptacle. The connector also includes a collar body disposed in the housing and retained between the housing's outer shell and a backbone. The collar body includes a swivel head coupled to a front end portion of the collar body, where the swivel head is configured to receive a ferrule. The swivel head is configured to pivot with respect to the front end portion of the collar body by a controlled amount upon a side pull force being placed on the connector and/or optical fiber.

15 Claims, 12 Drawing Sheets

(56) References Cited

U.S. PATENT DOCUMENTS

| | | | |
|---|---|---|---|
| 5,095,517 A * | 3/1992 | Monguzzi et al. | 385/90 |
| 6,287,018 B1 | 9/2001 | Andrews | |
| 7,280,733 B2 | 10/2007 | Larson et al. | |
| 7,369,738 B2 | 5/2008 | Larson et al. | |
| 7,429,136 B2 | 9/2008 | Lewallen et al. | |
| 2005/0036744 A1 | 2/2005 | Caveney et al. | |
| 2005/0094945 A1 | 5/2005 | Danley et al. | |
| 2008/0226236 A1 | 9/2008 | Pepin et al. | |
| 2009/0052844 A1 | 2/2009 | Van Der Steen | |
| 2009/0269014 A1 | 10/2009 | Winberg et al. | |

FOREIGN PATENT DOCUMENTS

| | | |
|---|---|---|
| KR | 10-0724076 B1 | 6/2007 |
| WO | WO 2007/050470 | 5/2007 |

OTHER PUBLICATIONS

Supplementary European Search Report for EP10767496.2, dated May 7, 2014, 7 pp.

* cited by examiner

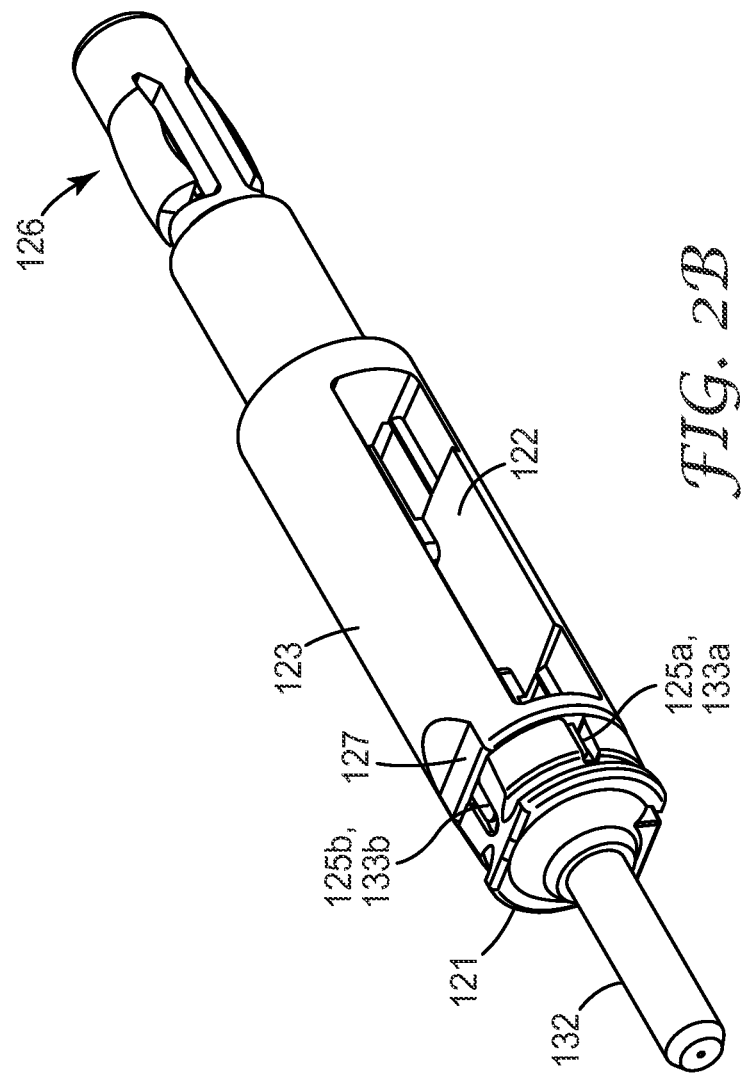

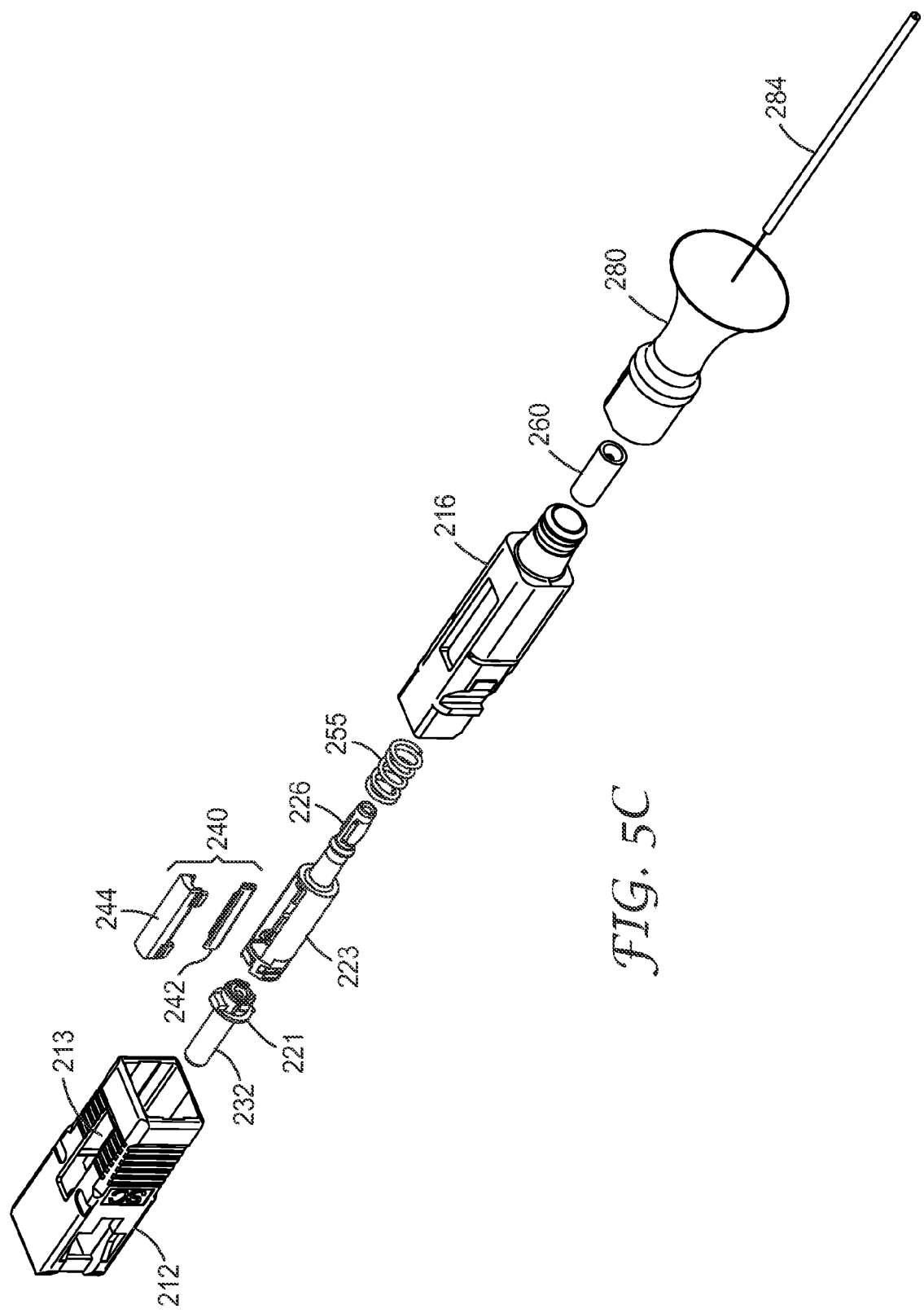

COLLAR BODY FOR FIELD TERMINABLE OPTICAL CONNECTOR

CROSS REFERENCE TO RELATED APPLICATIONS

This application is a national stage filing under 35 U.S.C. 371 of PCT/US2010/029600, filed Apr. 1, 2010, which claims priority to U.S. Provisional Application No. 61/171908, filed Apr. 23, 2009, the disclosure of which is incorporated by reference in its/their entirety herein.

BACKGROUND OF THE INVENTION

1. Field of the Invention

The present invention is directed to an optical fiber connector.

2. Related Art

Mechanical optical fiber connectors for the telecommunications industry are known. For example, LC, ST, FC, SC and other standard format, factory terminated optical connectors are widely used and are sold by a large number of commercial vendors. More recently, ferule-based optical fiber connectors that are to be assembled in the field have been developed. For example, SC connectors for field termination are known, such as described in U.S. Pat. Nos. 7,280,733 and 7,369,738. Small form factor connectors that are available include the Pretium LC (available from Corning), the Fast LC (available from Fujikura), the Opticam LC (available from Panduit), and Lightcrimp LC (available from Tyco).

These field terminated optical connectors must pass rigorous tests to meet the requirements of various optical fiber connector standards, such as Telcordia GR-326.

SUMMARY OF THE INVENTION

According to a first aspect of the present invention, an optical connector for terminating an optical fiber is provided. The optical connector includes a housing configured to mate with a receptacle. The connector also includes a collar body disposed in the housing and retained between the housing's outer shell and a backbone. The collar body includes a swivel head coupled to a front end portion of the collar body, where the swivel head is configured to receive a ferrule. The swivel head is configured to pivot with respect to the front end portion of the collar body by a controlled amount upon a side pull force being placed on the connector and/or optical fiber.

In another aspect, the front end of the main body portion comprises a front mating face, wherein the swivel head engages with the front mating face via an interference fit.

In another aspect, the swivel head includes a cylindrical lip having one or more slots formed therein and a centrally located spherically shaped ball piece surrounding a central bore configured to allow passage of the optical fiber to and/or from the ferrule.

In another aspect, the inner surface of the lip engages the outer surface of the mating face and the ball piece fits within a correspondingly shaped socket formed in the front mating face.

In another aspect, the front mating face of the main body portion includes one or more support projections that surround and support the socket, wherein at least one of the support projections has a different width than the other support projections.

In another aspect, the swivel head is configured to mount within an outer collar portion of a front mating face of the main body portion via a snap mechanism, where one or more snap projections formed on the swivel head are received by corresponding reception holes formed on the outer collar portion of the front mating face.

In another aspect, the collar body can further include a mechanical gripping device disposed therein and configured to grip at least one optical fiber. In another aspect, the mechanical gripping device is configured as a splice device to splice the optical fiber to a stub fiber mounted in the ferrule.

In one aspect, the optical connector further comprises a fiber boot coupled to an end of the housing to restrict a lateral motion of the second optical fiber.

In another aspect, the optical connector further comprises a buffer clamp configured within a rear portion of the collar body, the buffer clamp configured to clamp at least a portion of a buffer cladding of an optical fiber upon actuation.

In another aspect, the housing has one of an LC, SC, FC, ST, and MT format.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein:

FIG. 2B is an isometric view of the exemplary collar body of FIG. 2A according to an aspect of the present invention.

FIG. 5C is an exploded view of an optical connector according to an alternative aspect of the present invention.

Figure 1A:
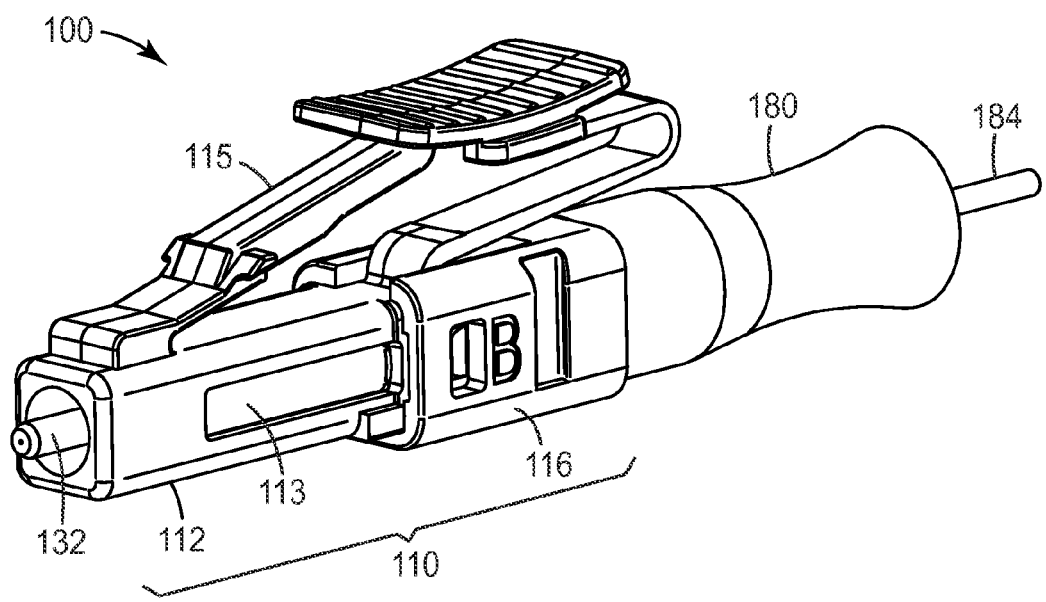
FIG. 1A is an isometric view of an optical connector according to an aspect of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention.

The present invention is directed to an optical connector. In particular, the optical connector of the exemplary embodiments comprises a field terminable, optical fiber connector of any standard or non-standard format having a flexible ferrule mounting portion that provides for controlled, modest pivoting or flexing during a side pull or force being placed on the terminated fiber or connector body. The exemplary connector described herein can be readily installed and utilized for Fiber To The Home (FTTH), data center and/or Fiber To The X (FTTX) network installations.

Figure 1B:
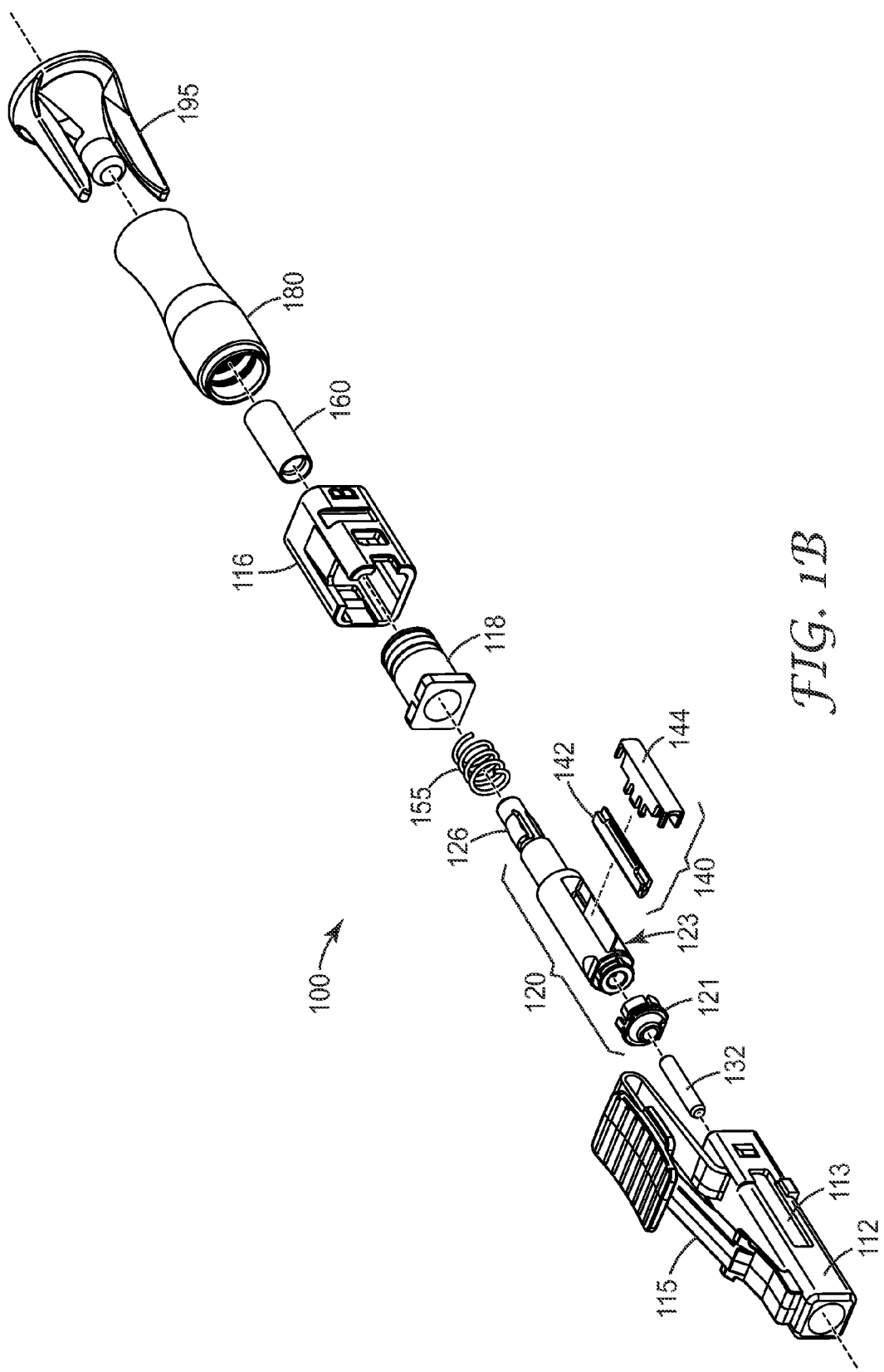
FIG. 1B is an exploded view of an optical connector according to an aspect of the present invention.

According to a first exemplary aspect of the present invention, an optical fiber connector 100 is shown in isometric view in FIG. 1A and in exploded view in FIG. 1B. FIGS. 2-4B show other views of the connector components. Optical connector 100 is configured to mate with a standard optical connector format, in this exemplary aspect, an LC receptacle. In other embodiments, optical connector 100 can be configured to mate with other standard, such as SC, FC, ST, MT, and non-standard receptacles, as would be apparent to one of ordinary skill in the art given the present description.

Optical fiber connector 100 can include a connector body having a housing 110 and a fiber boot 180. In this exemplary embodiment, housing 110 includes an outer shell 112, having a front face that is configured to be received in an LC receptacle (e.g., an LC coupling, an LC adapter, or an LC socket), and a backbone 116 (also referred to herein as a "clip") that provides further structural support and closes off the end of the connector to contain the ferrule 132, collar body 120, and spring 155 of the connector.

Shell 112 has an outer LC-shaped body format. In addition, housing 110 can include a latch 115 disposed on an outer surface of shell 112 that is configured to engage an LC receptacle and secure the connector 100 in place. The latch 115 is depressable and has sufficient flexibility so that the connector can be disengaged/released from the LC receptacle when the latch is activated with a modest pressing force.

Housing 110 also includes an opening 113 formed on a side of the shell 112 of sufficient size to allow for access to a mechanical gripping device 140, such as a mechanical splice, disposed therein (see further discussion below). Also, in one aspect, one or more access slots can be provided in shell 112 opposite opening 113 to allow access to the mechanical gripping device from the opposite side.

Backbone 116 is shaped to engage with shell 112 by a sliding or snap fit with an outer surface of a rear portion of shell 112. A shoulder portion formed on the interior surface of clip 116 provides a reaction face for the spring 155 to seat against. Clip or backbone 116 can further house a mounting structure 118 disposed in a rear portion of the backbone 116 that provides for coupling to a crimp ring, a fastener, and/or a fiber boot 180, which can be utilized to protect the optical fiber from bend related stress losses. A dustcap or endcap 195 can be mounted onto the boot 180 and used to protect the optical connector 100 prior to insertion or splicing of a field fiber 184.

According to an exemplary embodiment of the present invention, shell 112 and backbone 116 can be formed or molded from a polymer material, although metal and other suitably rigid materials can also be utilized. In a preferred aspect, the outer shell 112 is formed from a more flexible or pliant material than the backbone 116.

In an exemplary aspect of the present invention, connector 100 includes a collar body 120 (a collar body element may also be referred to as a "barrel") that is disposed within the connector housing 110 and retained therein. According to exemplary embodiments, the collar body 120 is a multi-purpose element that can, among other functions, retain and secure the ferrule 132. Optionally, the collar body 120 can further house a mechanical gripping device 140 and a fiber buffer clamp 126. The collar body is configured to have some limited axial movement within backbone 116. For example, the collar body 120 can include a shoulder that can be used as a flange to provide resistance against spring 155, interposed between the collar body and the clip 116, when the connector is inserted in a receptacle.

In a preferred aspect, the collar body 120 of the present invention provides a flexible mount for the ferrule 132. The amount of flexing (or pivoting) can be controlled while at the same time preserving rotational positioning. In this manner, the optical connectors described herein can sustain modest side pull forces of the terminated fiber of up to and beyond 4.5 lbs., without adversely affecting optical performance.

According to an aspect of the present invention, an exemplary collar body 120 is described below with respect to FIGS. 2A-4B. According to another aspect of the present invention, an exemplary collar body 220 is described below with respect to FIGS. 5A-7B. Either of these collar body designs may be used in the connector 100 shown in FIGS. 1A and 1B. Alternatively, the collar body designs described herein may be utilized in further optical connector designs, as would be apparent to one of ordinary skill in the art given the present description.

Figure 2A:
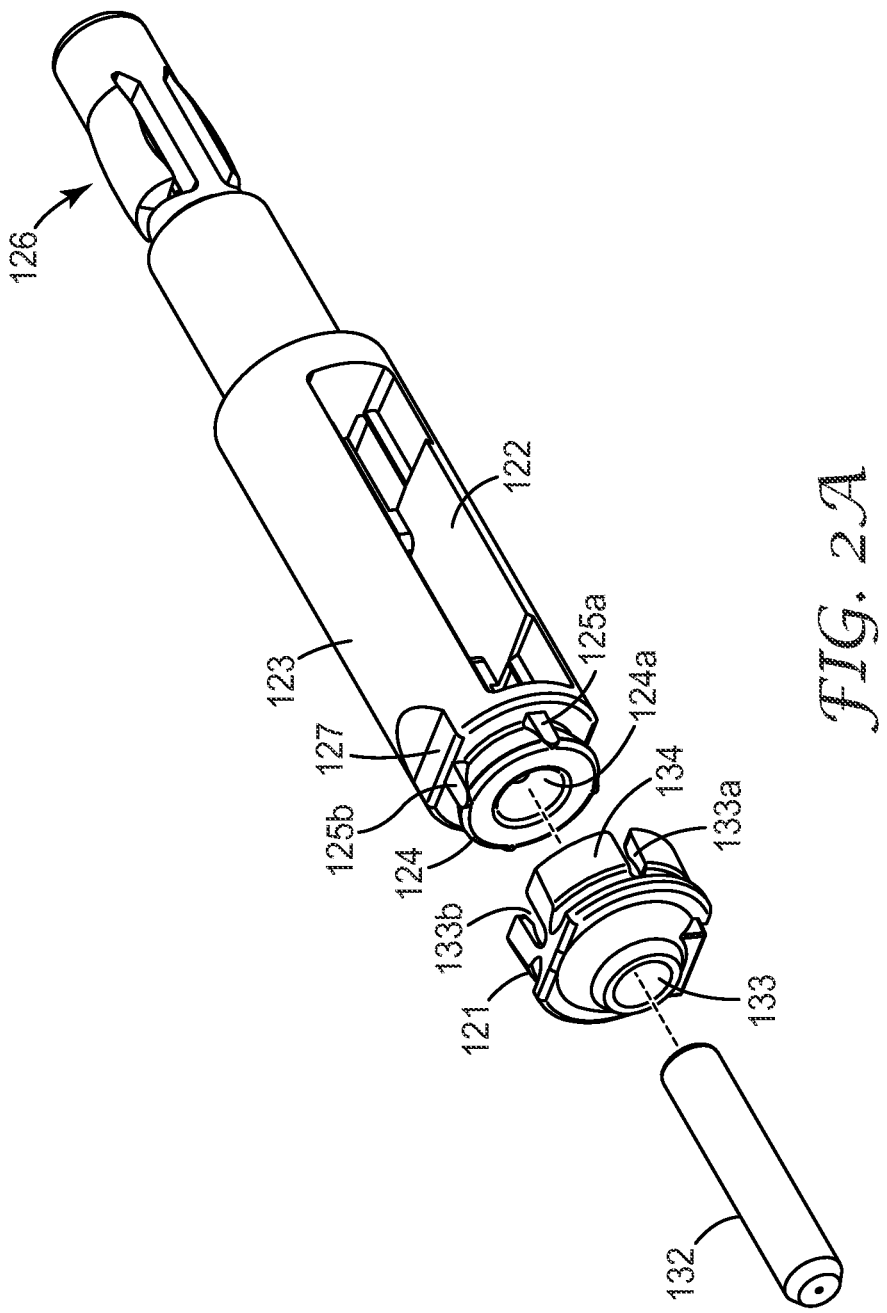
FIG. 2A is an exploded view of a first exemplary collar body according to an aspect of the invention.
Figure 3A:
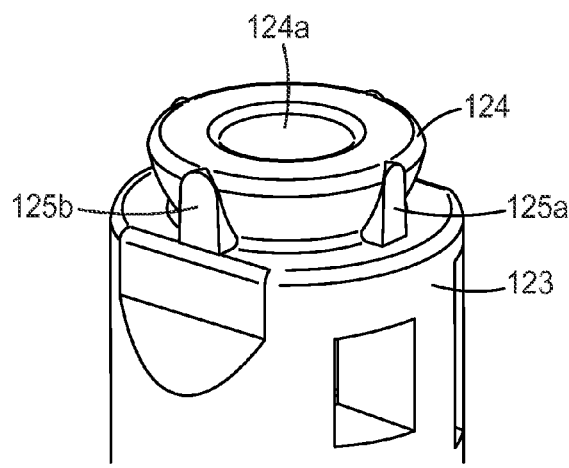
FIG. 3A is a close-up view of the mounting face of the exemplary collar body of FIG. 2A according to an aspect of the present invention.
Figure 3B:
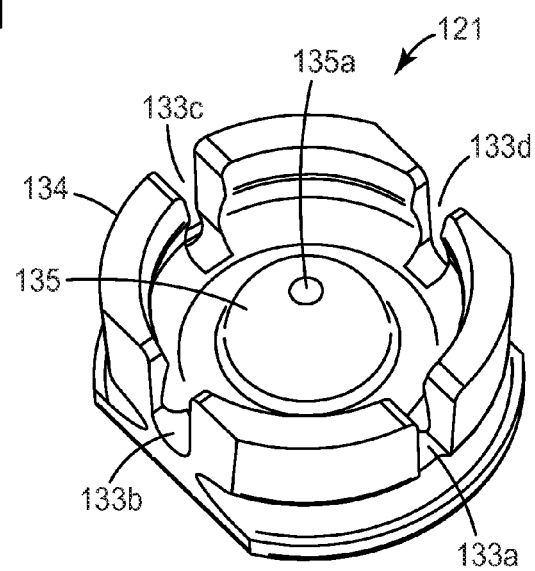
FIG. 3B is an isometric end view and FIG. 3C is a section view of a swivel head component of the exemplary collar body of FIG. 2A according to an aspect of the present invention.
Figure 3C:
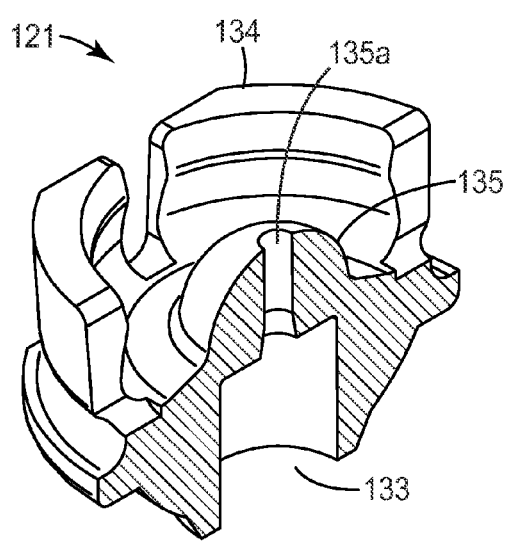

As shown in FIG. 2A, collar body 120 includes two main structures, swivel head 121 and main body 123. The swivel head 121 is configured to mount to a front end of the main body 123, such as front mating face 124, and includes an enlarged central bore 133 configured to receive ferrule 132. The ferrule 132 can be secured within enlarged central bore 133 via an adhesive, such as a thermally cured epoxy. In this exemplary aspect, the swivel head 121 includes a cylindrical lip 134 having one or more slots (in this case, four slots 133a-133d as shown in FIG. 3B) formed therein. Swivel head 121 also includes a centrally located spherically shaped ball piece 135 surrounding a central bore 135a configured to allow passage of the optical fiber to/from the ferrule 132. The swivel head 121 fits over the collar body's front mating face 124 via an interference fit, where the inner surface of lip 134 engages the outer surface mating face 124, and ball piece 135 fits within a correspondingly shaped depression or socket portion 124a formed in the front mating face 124.

In addition, the one or more slots 133a, 133b, etc. receive a corresponding number of support projections, such as support projections 125a, 125b, that surround and support the socket-shaped mating face 124. The one or more slots allow the swivel head 121 to flex outwardly, while the support projections 125a, 125b help prevent rotational movement of the swivel head 121 about the axis of the central bore 133. In another aspect, at least one of the support projections can have a different width than the remaining support projections in order for proper keying and orientation, if necessary. In the exemplary aspect of FIGS. 3A-3C, support projection 125b and corresponding slot 133b both have a greater width than the remaining support projections and slots. In this aspect, the swivel head 121 and mating face 124 can always be aligned in the same orientation.

Figure 4A:
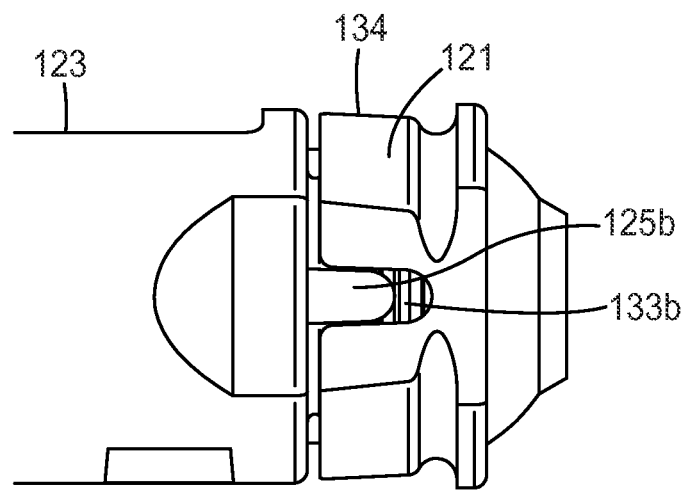
FIG. 4A is a side view and FIG. 4B is a section view of a swivel head component mounted onto the mounting face of the exemplary collar body of FIG. 2A according to an aspect of the present invention.
Figure 4B:
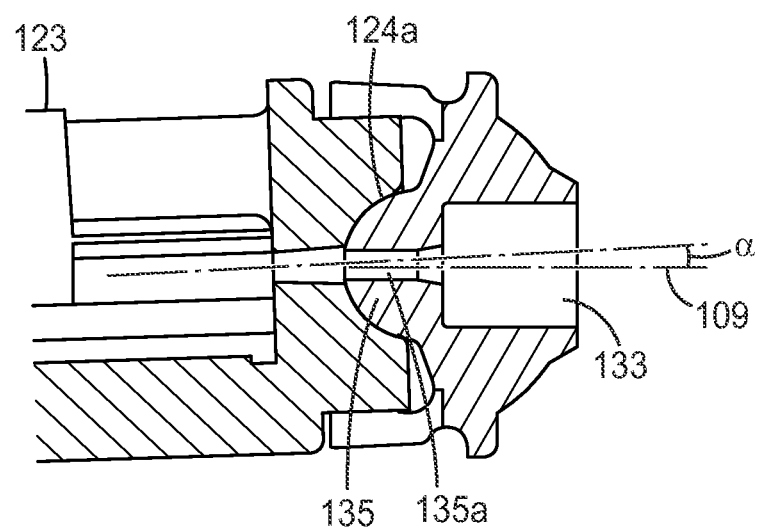

As mentioned above, the flexible ferrule mounting portion provides for a controlled, modest flexing during a side pull or force being placed on the optical fiber that is terminated in the connector. In a preferred aspect, the swivel head/main body configuration of the collar body can provide for a relative pivoting of up to a small angle (e.g., up to about 2° or up to about 3°) during a side pull to the connector and/or fiber. Such a side pull on the optical fiber can be transferred to the collar body, as the stripped portion of the fiber is tightly gripped and/or spliced within the collar body. As shown in FIGS. 4A (side view) and 4B (section view), the main body 123 of the collar body 120 is pulled (with respect to the swivel head 121) at about a 2° angle α from the centered optical axis 109. The 2° pivot angle corresponds to about a 5 lbs. side pull on the fiber, such as fiber 184, at a position near the boot 180 or slightly further downstream. In this example, the swivel head 121 and main body 123 are both formed of a polymer material that will allow some flexing. Also, the ball piece 135 can smoothly move over the socket portion 124a formed in the front mating face 124. However, the support projections 125a, 125b, etc., prevent the swivel head 121 from greater pivoting and rotation.

Collar body 120 can further include a keyed or flattened surface portion or portions 127 to ensure proper alignment within the connector housing as the collar body moves within the housing during use.

Thus, in a mated or connected state (i.e., the optical connector 100 is mated to a second connector or coupling), the flexible mounting portion of the collar body 120 allows for the ferrule 132 to remain in full frontal (face-to-face) contact with the mated ferrule. In this manner, the optical fibers will not become axially separated from each other, as a gap may be created at the ferrule interface under an excessive side pull to one or both connectors. As is understood, an axial separation or gap between the mated fibers can significantly reduce optical transmission between fibers. Also, the flexible mounting portion of the collar body 120 can reduce the likelihood that a side pull to a connector will cause the ferrule to act to pry open the sleeve portion of a standard adapter.

In another aspect, an alternative collar body 220, described with respect to FIGS. 5A-7B, can be utilized in connector 100. Alternatively, collar body 220 can be used in a different optical fiber connector, such as SC-format, optical fiber connector 200, shown in FIG. 5C. Note also that in a further alternative aspect, collar body 120 can be utilized within optical fiber connector 200.

According to exemplary embodiments, the collar body 220 is a multi-purpose element that can, among other functions, retain and secure the ferrule 232. Optionally, the collar body 220 can further house a mechanical gripping device 240. Collar body 220 can also include a fiber buffer clamp 226. The collar body 220 is configured to have some limited axial movement within a connector backbone, such as a backbone 216 (see FIG. 5C). For example, collar body 220 can include a collar or shoulder that can be used as a flange to provide resistance against spring 255, interposed between the collar body 220 and the backbone 216, when the connector is inserted in a receptacle.

Optical fiber connector 200 can include a connector body having a housing comprising an outer shell 212 and a backbone 216, and a fiber boot 280. In this exemplary embodiment, outer shell 212 has a front face that is configured to be received in an SC receptacle (e.g., an SC coupling, an SC adapter, or an SC socket). Backbone 216 (also referred to herein as a "clip") provides further structural support and closes off the end of the connector 200 to contain the ferrule 232, collar body 220, and spring 255 of the connector.

As shown in FIG. 5C, shell 212 includes an opening 213 formed on one side of sufficient size to allow for access to a mechanical gripping device 240, such as a mechanical splice, disposed therein. Backbone 216 is shaped to engage with shell 212 by a sliding or snap fit over an outer surface of a rear portion of shell 212. A shoulder portion formed on the interior surface of backbone 216 provides a reaction face for the spring 255 to seat against. Backbone 216 can further house a mounting structure disposed in a rear portion thereof that provides for coupling to a crimp ring, a fastener, and/or a fiber boot 280, which can be utilized to protect the optical fiber 284 from bend related stress losses. Shell 212 and backbone 216 can be formed or molded from a polymer material, although metal and other suitably rigid materials can also be utilized.

The collar body 220 also provides a flexible mount for a connector ferrule, here ferrule 232. The amount of flexing/pivoting can be controlled while at the same time preserving rotational positioning. In this manner, an optical connector comprising collar body 220 can sustain modest side pull forces of at least 4.5 lbs., without adversely affecting optical performance.

Figure 5A:
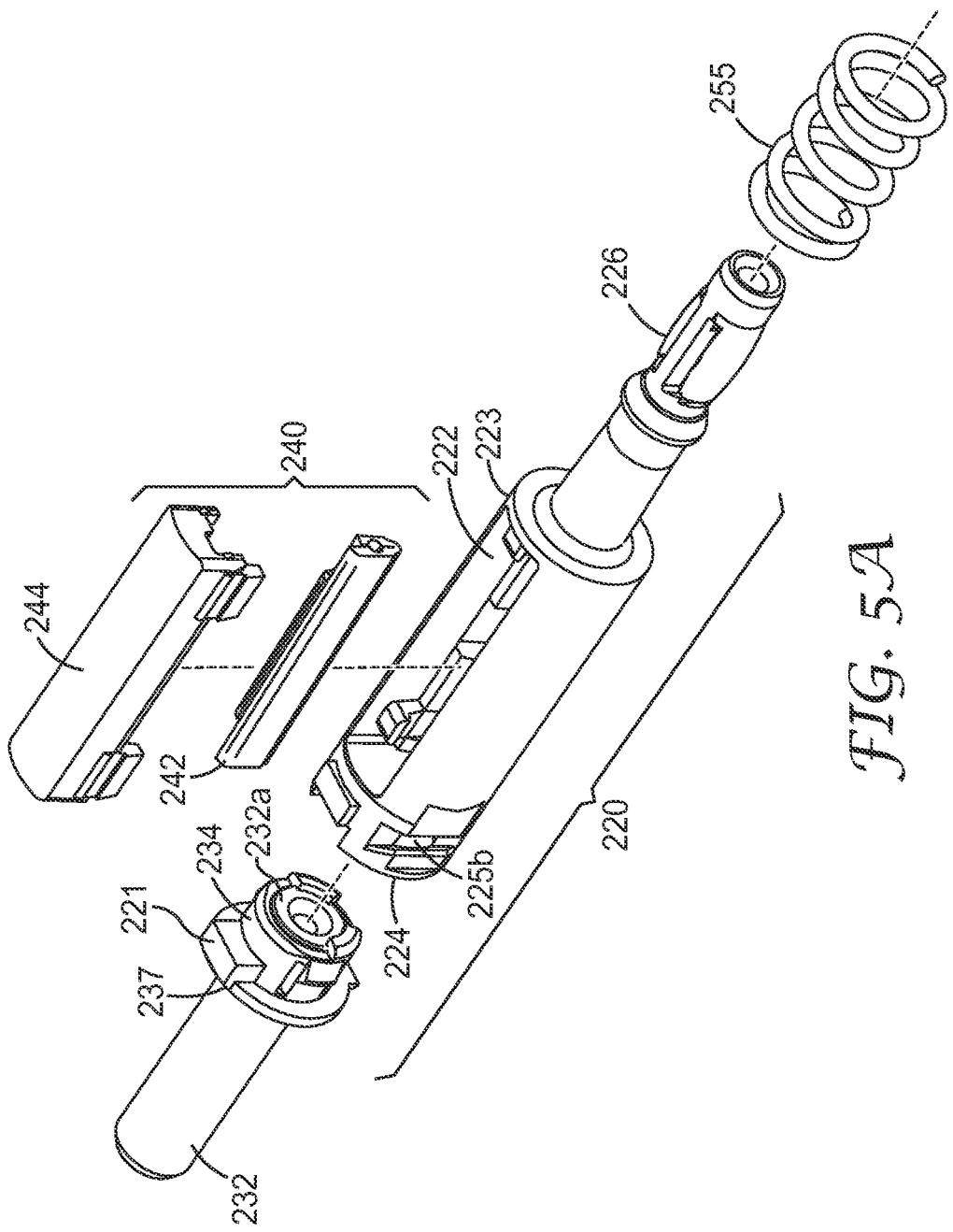
FIG. 5A is an exploded and FIG. 5B is an isometric view of a second exemplary collar body according to another aspect of the invention.
Figure 5B:
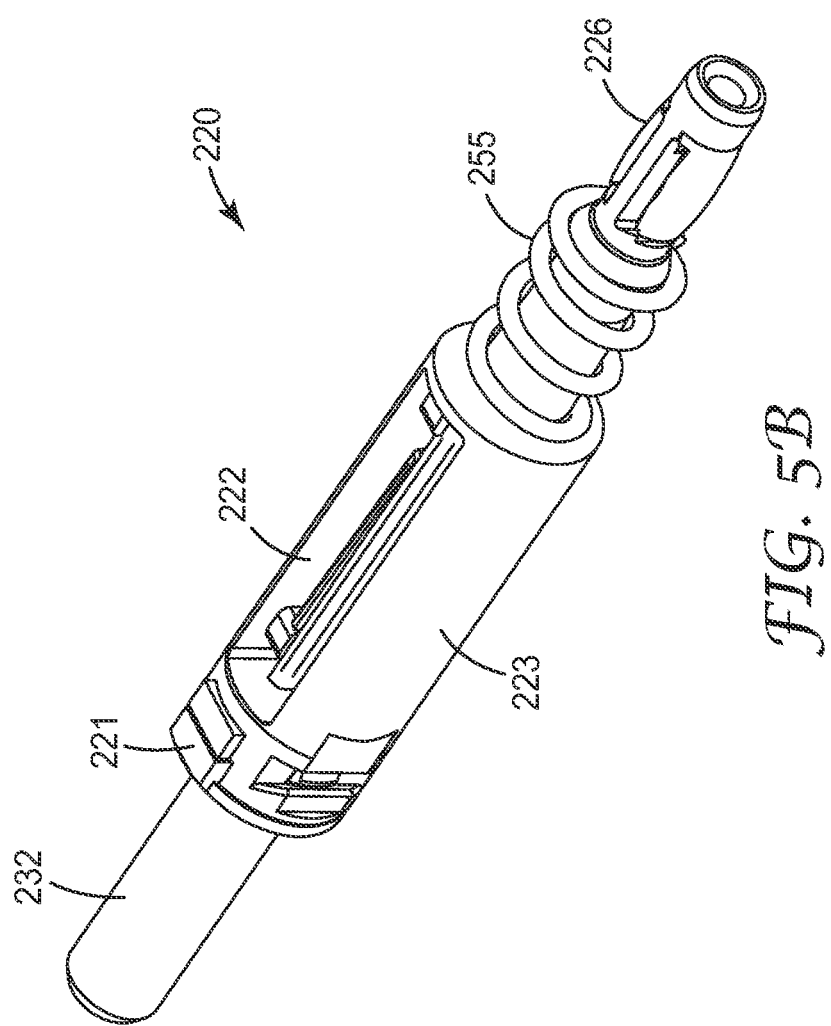
Figure 6A:
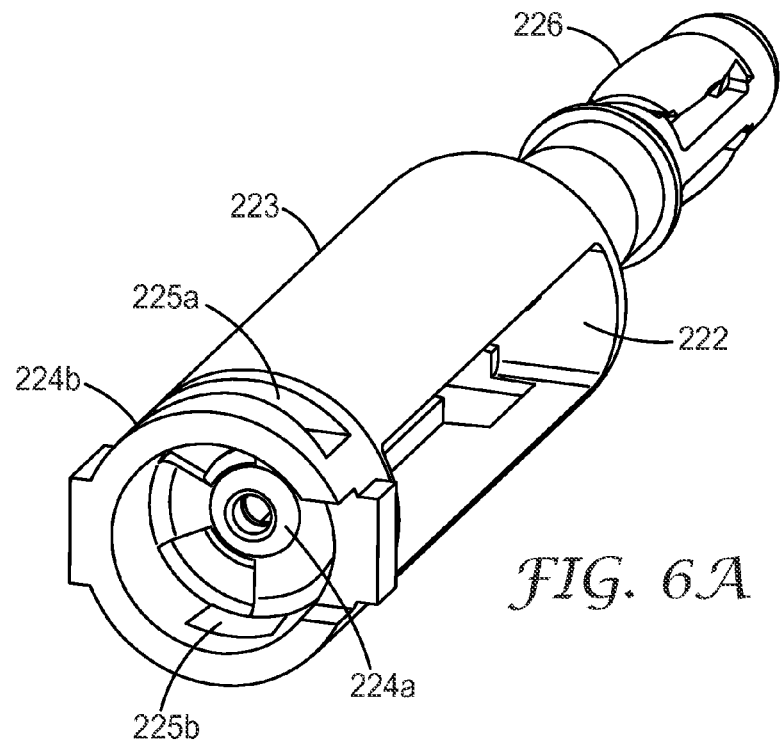
FIG. 6A is an isometric view of an exemplary main body portion of the collar body of FIGS. 5A and 5B according to an aspect of the present invention.
Figure 6B:
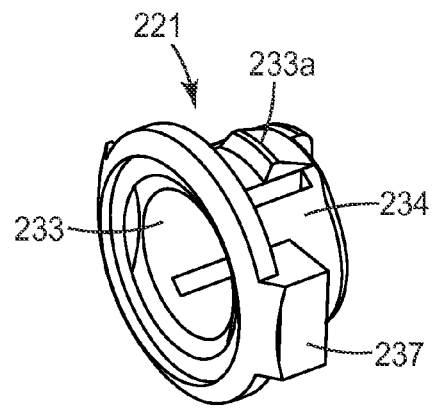
FIGS. 6B and 6C are front side and rear side views of a swivel head component of the exemplary collar body of FIGS. 5A and 5B according to an aspect of the present invention.
Figure 6C:
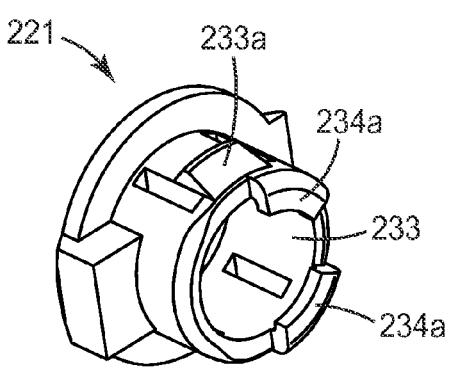

As shown in FIGS. 5A-5B, alternative collar body 220 includes two main structures, swivel head 221 and main body 223. The swivel head 221 is configured to mount to a front mating face 224 of main body 223 and includes a central bore 233 (see FIGS. 6B and 6C) configured to receive ferrule 232. In this exemplary aspect, the swivel head 221 is configured to mount within an outer collar portion 224b of the front mating face via a snap mechanism, where one or more snap projections 233a, 233b formed on the swivel head 221 can be received by corresponding reception holes 225a, 225b formed on the collar portion 224b. Swivel head 221 also includes one or more shoulders or stops 234a which serve as a backstop for the inserted ferrule 232. The swivel head 221 fits within the collar portion 224b of the front mating face 224, and allows the rear face 232a of the ferrule to swivel about a boss 224a formed on a surface of mating face 224 (see e.g. FIGS. 7A-7B, where only a portion of the full ferrule 232 is shown for simplicity).

In another aspect, the swivel head 221 further includes one or more keying features, such as protrusion 237 (see FIG. 6B), that can fit within a correspondingly shaped slot formed with the collar portion 224b of the front mating face. These keying features can provide for proper alignment and help prevent rotational movement of the swivel head during a side pull force.

Figure 7A:
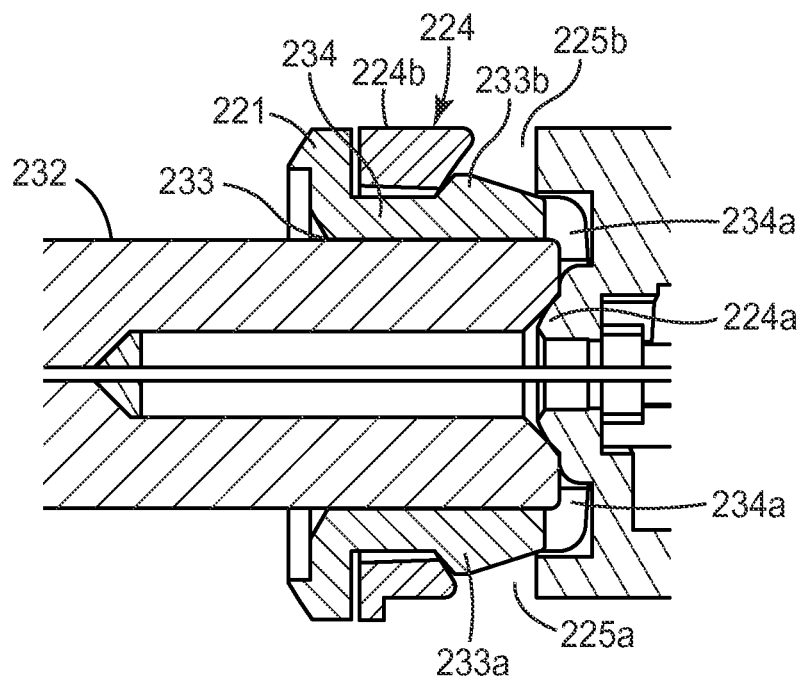
FIGS. 7A and 7B are top and side section views of a swivel head component mounted onto the mounting face of the exemplary collar body of FIGS. 5A and 5B according to an aspect of the present invention.
Figure 7B:
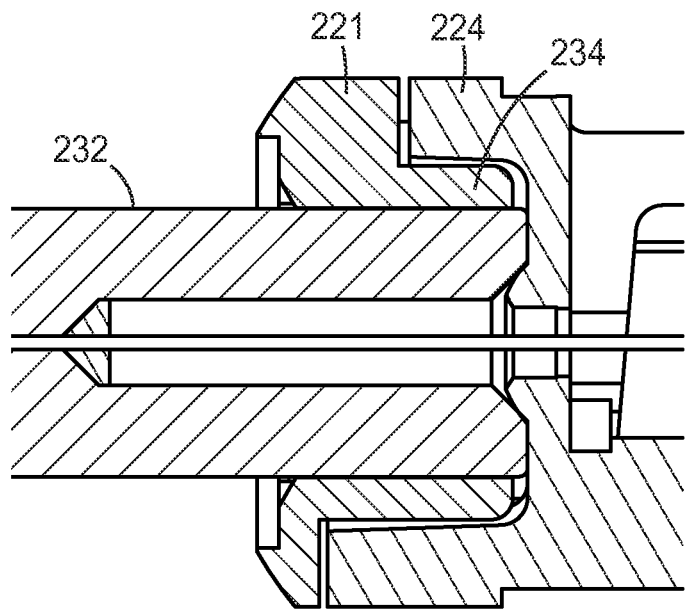

As is illustrated in FIGS. 7A-7B, the spacing between the outer edges of the swivel head 221 and the collar portion 224b (when the ferrule 232 is fully seated) can prevent pivoting beyond a modest swivel angle, such as a 2° angle, during a side pull of the fiber or connector. In this manner, when the connector flexes, the fiber path length can be kept at the same length (to further minimize tensile and compressive loads on the fiber). Thus, as with the aspect of collar body 120, the alternative collar body 220 also provides a controlled, flexible mount for a connector ferrule, here ferrule 232.

Referring back the general structure of the optical connector 100, 200, an exemplary collar body 120, 220 can optionally house a gripping device 140, 240, which includes a gripping element 142, 242 and an actuating cap 144, 244. The gripping element 142, 242 is mountable in a mounting device or cradle located in an opening 122, 222 of the collar body 120, 220. The gripping device can be implemented in a similar manner to that as is described in US Patent Application Publication No. 2008/0226236 A1, incorporated by reference herein in its entirety. Alternatively, the gripping device can be utilized as a splice device, where ferrule 132, 232 would further include a fiber stub mounted therein. Such an example implementation is described in U.S. Pat. No. 7,369,738, incorporated by reference herein in its entirety, and US Patent Publication No. 2009/0269014 A1, incorporated by reference herein in its entirety. Also, according to an exemplary embodiment of the present invention, collar body 120, 220 can be formed or molded from a polymer material, although metal and other suitable materials can also be utilized.

Ferrule 132, 232 can be formed from a ceramic, glass, plastic, or metal material to support an optical fiber inserted therein. In a preferred aspect, ferrule 132, 232 is a ceramic ferrule. The ferrule will include a central bore in which the optical fiber is inserted. The central bore may be counter bored throughout at least a portion of the ferrule if an epoxy is used (such as in the case of a stubbed fiber). For example, as shown in FIGS. 7A and 7B, the ferrule 232 can include a counterbore portion that allows for a larger fiber bend than if the fiber is anchored at the rear end of the ferrule. An optical fiber inserted through the ferrule 132, 232 may have a terminal end that slightly protrudes from or is coincident or coplanar with the end face of ferrule 132, 232, depending on the application. The fiber end may be factor polished or field polished (e.g., a flat or angle-polish, with or without bevels). For embodiments using a fiber stub, a second end of the fiber extends part-way into the interior of the connector 100, 200 and is utilized to splice a second optical fiber, such as a field fiber.

The stub and/or field fiber(s) can comprise standard single mode or multimode optical fiber, such as SMF 28 (available from Corning Inc.). In addition, the fiber can be part of a jacketed or unjacketed cable configuration. For example, for a jacketed cable, the Kevlar (strength member) strands can be anchored to the housing.

Further, in some embodiments, the collar body 120, 220 can optionally include a buffer clamp 126, 226 that can be configured to clamp the buffer portion of the field fiber 184, 284 being gripped or spliced. In an exemplary aspect, the buffer clamp 126, 226 is disposed within the interior of the backbone 116, 216 in the fully assembled connector. In one aspect, buffer clamp 126, 226 is an integral part of the connector structure that engages the outer surface of a buffered fiber when a sleeve 160, 260 is slidingly fitted over buffer clamp 126 by moving sleeve 160, 260 on an axial direction towards the connector housing. Other alternative buffer clamp structures can also be utilized, as would be apparent to one of ordinary skill in the art given the present description.

For field terminated connector implementations, exemplary preparation and installation processes are described in US Patent Application Publication No. 2008/0226236 A1 and U.S. Pat. No. 7,369,738, incorporated by reference above.

Figure 8:
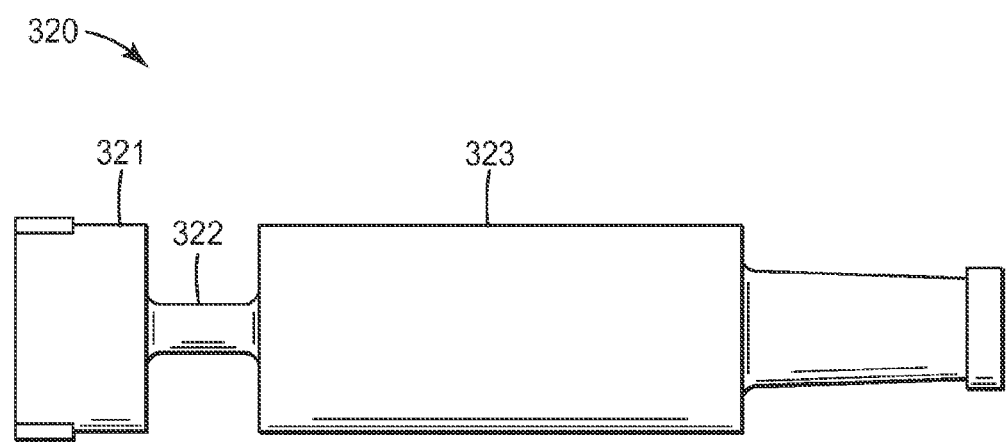
FIG. 8 is a side view of an optical connector according to another aspect of the present invention.

In a further alternative aspect, as is shown in FIG. 8, an alternative collar body 320 can be formed from a single piece construction, where swivel head 321, having an enlarged central bore formed therein which can secure a ferrule (not shown), is integrally formed with main body portion 323. A neck 322, also having a central bore, couples the swivel head to the main body portion and has an outer body diameter much smaller than the outer body diameter of the swivel head 321. Collar body 320 can be formed or molded from a polymer material. This collar body 320 can be configured to be disposed within an optical fiber connector such as is described herein. Thus, in a mated or connected state (i.e., the optical connector is mated to a second connector or coupling), the flexible mounting portion of the collar body 320 allows for the ferrule to remain in full frontal (face-to-face) contact with a mated ferrule.

As is understood in view of the description above, the exemplary collar body designs with a flexible/pivoting ferrule mounting portion can provide robust field terminated (and factory terminated optical connectors that can sufficiently function under modest side pulls, such as defined by the Telcordia GR-326 standard. In particular, an optical connector of the exemplary embodiments comprises a field terminable, optical fiber connector of any standard or non-standard format having a flexible ferrule mounting portion that provides for controlled, modest flexing during a side pull or force being placed on the terminated fiber. Such exemplary connectors can be readily installed and utilized for FTTP and/or FTTX network installations, such as part of a fiber distribution unit. The particular LC connector designs can further provide for more compact configurations in other outside plant applications, such as pedestals, closures, terminals, and fiber NIDS, to name a few.

Various modifications, equivalent processes, as well as numerous structures to which the present invention may be applicable will be readily apparent to those of skill in the art to which the present invention is directed upon review of the present specification.

We claim:

1. An optical fiber connector for terminating an optical fiber, comprising:
   a housing configured to mate with a receptacle; and
   a collar body disposed in the housing and retained therein, the collar body including a swivel head and a main body portion, wherein the swivel head is coupled to a front end of the main body portion, wherein the swivel head is configured to receive a ferrule and to pivot, with respect to the front end of the main body portion of the collar body, by a controlled amount upon a side pull force being placed on the connector and/or optical fiber and wherein the swivel head is configured to mount within an outer collar portion of a front mating face of the main body portion via a snap mechanism wherein one or more snap projections formed on the swivel head are received by corresponding reception holes formed on the outer collar portion of the front mating face.

2. The optical fiber connector of claim 1, wherein the front end of the main body portion comprises a front mating face, wherein the swivel head engages with the front mating face via an interference fit.

3. The optical fiber connector of claim 1, wherein the swivel head includes a cylindrical lip having one or more slots formed therein and a centrally located spherically shaped ball piece surrounding a central bore configured to allow passage of the optical fiber to and/or from the ferrule.

4. The optical fiber connector of claim 3, wherein the front end of the main body portion comprises a front mating face, wherein the inner surface of the lip engages the outer surface of the mating face and the ball piece fits within a correspondingly shaped socket formed in the front mating face.

5. The optical fiber connector of claim 4, wherein the front mating face of the main body portion includes one or more support projections that surround and support the socket, wherein at least one of the support projections has a different width than the other support projections.

6. The optical fiber connector of claim 1, wherein the collar body is disposed in the housing and is retained between an outer shell and a backbone.

7. The optical fiber connector of claim 1, wherein the collar body includes an opening to receive a gripping device comprising a gripping element and an actuating cap.

8. The optical fiber connector of claim 7, wherein the collar body includes a fiber stub disposed in a first portion of the collar body, the fiber stub including a first optical fiber mounted in the ferrule and having a first end proximate to an end face of the ferrule and a second end, wherein the gripping device comprises a mechanical splice disposed in a second portion of the collar body, the mechanical splice configured to splice the second end of the fiber stub to the optical fiber.

9. The optical fiber connector of claim 1, wherein the collar body further includes a keyed surface portion to ensure proper alignment within the housing as the collar body moves within the housing during use.

10. The optical fiber connector of claim 1, further comprising:
a fiber boot coupled to an end of the housing to restrict a lateral motion of the optical fiber.

11. The optical fiber connector of claim 1, further comprising:
a buffer clamp configured within a rear portion of the collar body, the buffer clamp configured to clamp at least a portion of a buffer cladding of the optical fiber upon actuation.

12. The optical fiber connector of claim 11, further comprising:
a buffer clamp actuation sleeve configured to slidably actuate the buffer clamp.

13. The optical fiber connector of claim 1 mated with a second optical fiber connector in an adapter, wherein the optical fiber connector maintains optical contact with the second optical fiber connector while the optical fiber sustains a side pull force of at least 4.5 pounds.

14. An optical fiber connector for terminating an optical fiber, comprising:
a housing configured to mate with a receptacle; and
a collar body disposed in the housing and retained therein, the collar body including a swivel head and a main body portion, wherein the swivel head is coupled to a front end of the main body portion, wherein the swivel head is configured to receive a ferrule and to pivot, with respect to the front end of the main body portion of the collar body, by a controlled amount upon a side pull force being placed on the connector and/or optical fiber, and wherein the swivel head includes a cylindrical lip having one or more slots formed therein and a centrally located spherically shaped ball piece surrounding a central bore configured to allow passage of the optical fiber to and/or from the ferrule.

15. An optical fiber connector for terminating an optical fiber, comprising:
a housing configured to mate with a receptacle; and
a collar body disposed in the housing and retained therein, the collar body including a swivel head and a main body portion, wherein the swivel head is coupled to a front end of the main body portion, wherein the swivel head is configured to receive a ferrule and to pivot, with respect to the front end of the main body portion of the collar body, by a controlled amount upon a side pull force being placed on the connector and/or optical fiber, wherein the collar body includes an opening to receive a gripping device comprising a gripping element and an actuating cap, wherein the collar body includes a fiber stub disposed in a first portion of the collar body, the fiber stub including a first optical fiber mounted in the ferrule and having a first end proximate to an end face of the ferrule and a second end, and wherein the gripping device comprises a mechanical splice disposed in a second portion of the collar body, the mechanical splice configured to splice the second end of the fiber stub to the optical fiber.

* * * * *